Figure 1:
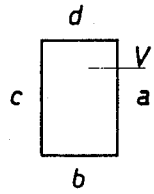

Oct. 26, 1965  F. CELENTANO  3,214,082
SELF-CLOSING CONTAINERS AND METHOD
OF THEIR MANUFACTURE
Filed Oct. 10, 1962  2 Sheets-Sheet 1

INVENTOR.
Francesco Celentano

INVENTOR.

Francesco Celentano

United States Patent Office 3,214,082
Patented Oct. 26, 1965

3,214,082
SELF-CLOSING CONTAINERS AND METHOD OF THEIR MANUFACTURE
Francesco Celentano, La Spezia, Italy, assignor to Polymer Industrie Chimiche S.p.A., Milan, Italy, a corporation of Italy
Filed Oct. 10, 1962, Ser. No. 229,653
Claims priority, application Italy, Oct. 13, 1961, 18,627/61
4 Claims. (Cl. 229—62.5)

My invention relates to a valve-type device for automatically closing flexible containers, to containers embodying said device, and to the process of manufacturing said containers.

The flexible containers according to my invention may be made of plastic, paper, jute fabric or other flexible material, and are provided in their upper portion with a valve-type device which allows filling of the container by means of the customary bag-filling machines, and after the bag is filled, causes automatic closing of the container.

Heretofore, flexible containers provided with self-closing valve type means frequently have complex structural characteristics which complicate their fabrication in practice and involve multiple seam welds or connections, and thus result in rejects because of the possibility of errors, or unsatisfactory sealed joints because of the complicated sealing operations. This obviously greatly influences the total cost of the container.

It is therefore an object of the present invention to provide a novel flexible container with a flat valve-type automatic closing device which will be relatively simple and inexpensive to manufacture.

It is a further object of my invention to provide a container and valve device which greatly improves the known containers from the above-mentioned viewpoints and which also results in a substantially simplified manufacturing process.

According to one feature of my invention, a flexible tubular article which is open at least on one of its transverve ends is formed or employed as a starting material for the container. Inside of this tubular article, at a short distance from one of its transverse edges, a flat valvular element consisting of a single sheet of flexible material is affixed by means of a weld of a seam which extends along two adjacent edges of the sheet element. A filling opening is provided, either by cutting the container wall near the seam, or by leaving an opening between the front and back walls of the container along the container edge. This filling opening has one end positioned near the junction of the valve element seams, and extends parallel to the longitudinal axis of the tubular article. The tubular article is then flattened so as to bring its front and back walls into contact with each other in order to form an extreme longitudinal edge of the container near the cut opening. This longitudinal extreme edge consists of a bend or crease between the front and back container walls, obtained by the flattening operation. Finally, the transverse ends at the top and bottom of the tubular article are sealed to complete the container and permanently fix the position of the longitudinal edges, the top seal being located slightly above the upper edge of the sheet valvular element.

According to another feature of the invention, the fastening means or seam of the sheet valve element has two portions which extend along the two orthogonal sides or edges of the valve element. One of these seam portions extends along and coincides with the side of the tubular article parallel to and opposite the side of the valve element side nearest the upper edge of the tubular container.

According to a further feature of the invention, the fastening means or seam along the two orthogonal sides of the container presents a curved or semi-circular connection at the crossing of its two seam branches.

According to a further feature of the invention, the filler opening, which may be a cut in the container wall, runs in a direction parallel to the longitudinal axis of the tubular container and begins at a point near the center of the curved semi-circular connection of the above-mentioned seam branches.

In the process according to the invention, one of the most important steps is the flattening of the tubular element in order to form as a bend or crease the extreme longitudinal edge of the container. According to one embodiment of the invention this extreme edge is made so that the opening cut coincides with this longitudinal edge, namely so that the filling mouth of the container is located just at one end, i.e., along the most external generatrix of the tubular article. In this case, the two branches of the seam fastening lie on two different walls of the tubular element.

According to another embodiment of the invention, the extreme longitudinal edge is located in such a position that the cut for the filling opening is located more internally, namely so that the filling mouth of the container is disposed in an internal area of one of the container wall. In this modification, the two branches of the fastening seam are situated on one and the same part of the tubular element, thus obtaining a novel valve structure characterized in the fact that it has a single fastening with two orthogonal branches, both situated on the same container wall.

The invention will be further described by reference to the accompanying drawings showing by way of example, but not for the purpose of limitation, preferred embodiments of the invention.

Figure 2:
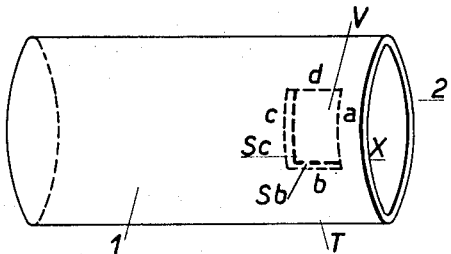
Figure 3:
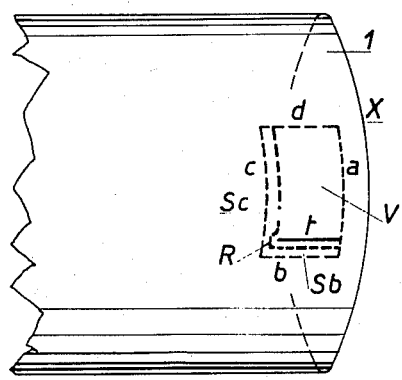
Figure 4:
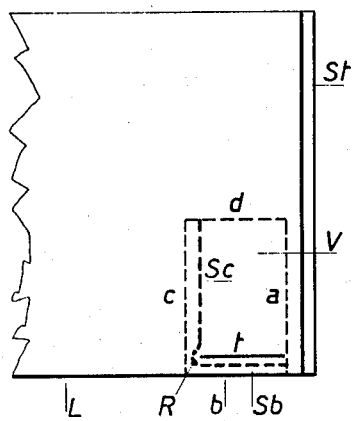
Figure 5:
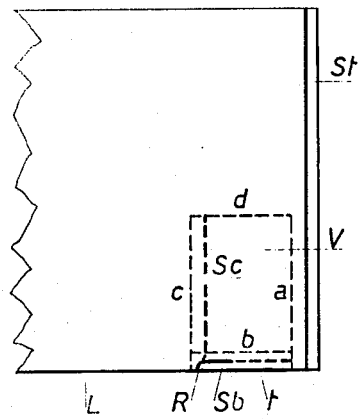
Figure 6:
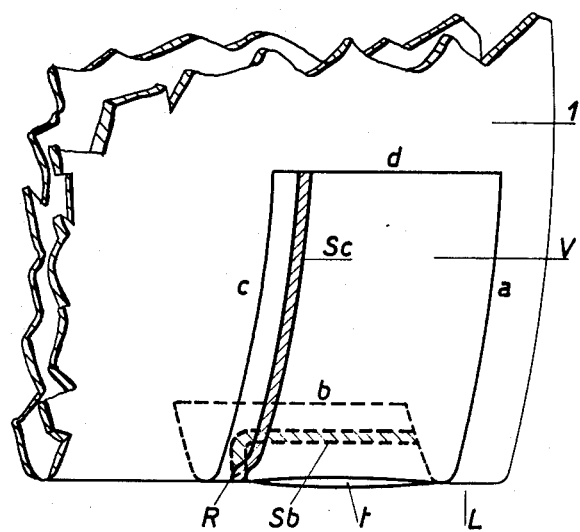
Figure 7:
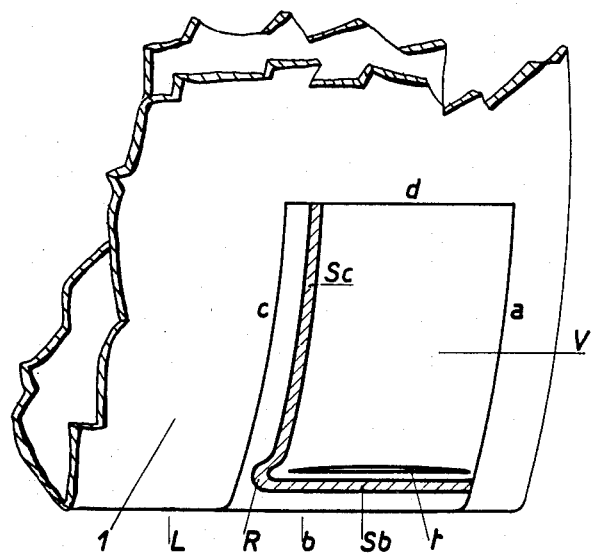

In the drawings:
FIG. 1 is a front view of the basic element of the valve, removed from the container;
FIG. 2 is a schematic perspective view of a tubular element of the container with the valve member of FIG. 1 fastened inside thereof;
FIG. 3 is a schematic fragmentary perspective view of the portion of the container to which, inside, the valve element of FIG. 1 is shown fastened, and also showing a filling opening formed in the container wall;
FIG. 4 is a schematic front view showing a portion of the container to which the valve element is fastened;
FIG. 5 is a modification of the embodiment of FIG. 4;
FIG. 6 is a fragmentary perspective view of the valve structure corresponding to the modification represented in FIG. 5;
FIG. 7 is a fragmentary perspective view of the valve structure corresponding to the embodiment represented in FIG. 4.

As shown in FIG. 1, the valve member V according to the invention consists of a flexible single piece or flat strip of a laminate, film or sheet having any form or size, and presenting four edges $a$, $b$, $c$ and $d$.

As shown in FIG. 2, a tubular article T is provided, which may be made of plastic film material, laminate, fabric, paper, jute or other flexible material. The article T is open at its two transverse ends and presents a front face or wall 1 and a back face or wall 2. The container can also be made by starting with a flat film, and bending and sealing it with a longitudinal fastening in order to form the tube T. The valve element V is then fastened inside of the tubular container 1 by means of fastenings which may be seams, stitching or heat welds, or other suitable means for attaching depending on the type of material being used for the container and valve elements.

In the first stage of the manufacturing process according to the invention, the valve element V is inserted into the tubular element T and is fastened to the front face 1 by means of a single inner festening seam having two branches $S_b$ and $S_c$ which run substantially parallel to the edges $b$ and $c$, respectively, of the valve element sheet V, as illustrated in FIG. 2.

FIG. 3 illustrates in a perspective view a fragmentary portion of the tubular element T. The valve element V has been welded inside the wall 1 of the tubular container, and a cut $t$ has been formed. The element V is shown in dotted lines, since it is inside the tube T and fixed inside to the wall 1 of the tubular article T which forms the container. One side edge $a$ of the tubular element V is positioned parallel to and situated at a given distance, e.g. a few centimeters, from the transverse edge X of the tubular wall of the container. In FIG. 3 the seam or fastening which attaches the elevent V to wall 1 is carried out by producing a continuous seal having substantially an L-shape with one branch $S_b$ which connects the element V to the bag wall 1 along the short side $b$ of the valve element V, and another seam branch $S_c$ along one long side $c$ of the element V, parallel to and opposed to the other long side $a$. The two branches $S_b$, $S_c$ of the L-shaped seam may be made simultaneously, but in the case of heat sealing of plastic materials the seam branches are produced preferably in the sequence: $S_b$, $S_c$.

As indicated at R in FIG. 3, the fastening seam can be made so as to obtain a small curve or semi-circle R therein at the crossing of the seam branches $S_b$, $S_c$. The semicircle R preferably has a diameter of a few centimeters, e.g., 1 to 5 centimeters and preferably 2 to 3 cm., and is tangent to seam $S_b$. This curve or semi-circle R serves as a reinforcing for the container and valve portion in the area at the left end of the cut $t$ in the wall 1, which is then formed immediately thereafter for producing a filling opening for the container.

The aforementioned cut $t$ is made only in the front wall 1 of the tubular container as shown in FIG. 3. It does not extend into the valvular element V located immediately below and forming the valve. The cut $t$ extends along a line parallel to the seam branch $S_b$ and drawn through the center of the semi-circle R, and extends as far as the other end $a$ of the valve element V.

The next step according to the method of the invention is to flatten the tubular article T so that the front and rear walls 1, 2 abut together and form a longitudinal bend or crease L along one of the common longitudinal edges. When the container is flattened from the position of FIG. 3, the longitudinal crease or bend L can be made to coincide with the cut $t$, as shown in FIGS. 5 and 6, namely so that the container mouth or filler opening $t$ lies directly on the bend L. Alternatively, the container can be flattened so that the bend or crease L is spaced from the cut $t$, so that the latter remains in the front face 1 after the flattening operation, as shown in FIGS. 4 and 7.

With either modification, the container thus bent or creased along L is then subjected to a fastening operation to provide a seam $S_t$ along the transverse edge X of the container, which thus gives a permanent disposition to the bend or crease L. The container is now complete and ready for being filled with material through the opening $t$.

The fastening seam $S_t$ is positioned parallel to and closely adjacent, at a minimum distance, e.g. a few centimeters, from the side $a$ of the flat valvular element V, but without coinciding with the latter side $a$. In other words, the side $a$ of the element V is not fastened to either of the walls 1 or 8, but remains free and unattached. The seal $S_t$ involves and joins only the two walls 1 and 2 of the container.

The novel pocket valve and container operates as follows. While the container is being filled with flowable material, the latter will enter the container through the filling opening $t$, pass across the free and unattached edges $d$ and $a$ beyond the free edge of the sheet valvular member V and drop into the container. When the container is substantially filled, the container is preferably inverted so that the seam $S_t$ is on the bottom. The flowable material in the bag will press the free edges $a$ and $d$ of the sheet valvular member V flush against the walls common to the welds $S_c$ and $S_b$ to thereby prevent discharge of the material past the edges $a$ and $d$ or out through the opening $t$.

The manufacturing process and the function of the valvular member V is identical in the embodiments of FIGS. 4 and 7 on the one hand in FIGS. 5 and 6 on the other hand. The differences are only in spacing the bend L relative to the cut $t$ during the fabrication steps. In the structural embodiment according to FIGS. 4 and 7, the cut $t$ is situated slightly inward toward the center portion of the wall relative to the crease or bend L of the container, and in this case the fastening seam branches $S_b$ and $S_c$ are both located on the front wall 1 of the tubular element T.

In the alternative embodiment according to FIGS. 5 and 6, the cut $t$ coincides with the crease or bend L, and in this case the valvular element V is fixed into position with its side edge $c$ being sealed by seam branch $S_c$ fastening the valvular element V to wall 1, and with the side $b$ sealed to wall 2 of the tubular element T by means of the seam branch $S_b$, as is best illustrated in FIG. 6.

For the sake of clarity, in the perspective views of FIGS. 6 and 7, the tubular element T forming the container is considered to be transparent, and the portions of the valve V and its seams which are located on the inner surface of wall 1 are therefore seen in solid lines.

As is evident from the foregoing description, the advantages offered by the invention comprise three novel features which do not occur simultaneously in any of the heretofore known types of containers. More particularly, these novel features may be summarized as follows:

(1) In the manufacturing process of the container according to the invention, a tubular article is used having at least one end open, for the container body, and a flat sheet element is provided for the valve of the container.

(2) Only three very simple operations are sufficient to complete the container. The first operation comprises the fastening of the valvular element V along the seam branches $S_b$ and $S_c$. The second operation comprises the making of the cut $t$ in the wall 1; and the third operation comprises the flattening to form the bend or crease L and forming the fastening seams such as $S_t$ along the transverse top and bottom edges of the container.

(3) The fastenings or seams required for completing the container together with its valvular member involve always only two thicknesses of material, and no more. Thus, there is never introduced the possibility of incomplete heat sealing, or the difficulties which occur with added thicknesses or layers of material.

While the invention has been described with reference to the particular embodiments shown in the drawings, it is obvious that the invention is not limited to these embodiments nor to any particular type of material. For instance, the valve member V may be given a different shape than that illustrated, and its edges need not be parallel. The location of the valve member V of the bag may be closer or further from the upper edge X having seam $S_t$, as long as the seam $S_t$ does not coincide with the edge $a$. The valvular element V may also be placed inclined with respect to the seam $S_t$. The dimensions of the member V and of the walls may be given any desired ratio, and the walls 1 and 2 may form a bag shaped like a truncated cone.

It will be obvious to those skilled in the art, upon a study of this disclosure, that this invention permits of various modifications and alterations with respect to the individual components and method steps disclosed, and hence can be embodied in articles other than as particularly illustrated and described herein, without departing from the essential features of the invention and within the spirit and scope of the claims annexed hereto.

I claim:
1. A process for producing a self-closing flexible container, comprising inserting into a tubular article made of flexible material and which has two transverse ends open, a flat flexible sheet member having two adjacent edges substantially at right angles to each other attaching said sheet member inside said tubular article at a location so that one edge of said sheet member is closely adjacent but spaced from one of said transverse ends, said attaching operation comprising fastening said sheet member with an L-shaped seam having two branches respectively extending along said two adjacent edges of said sheet member, then making a substantially linear cut in said tubular article extending from a point inwardly of the intersection of said two branches and in a direction substantially parallel to the longitudinal axis of said tubular article, flattening said tubular article so as to form a crease along an extreme generatrix of said tubular article at a predetermined position relative to said cut, and subsequently sealing at least said one transverse end to fix said crease and said cut at said predetermined position.

2. Process according to claim 1, said flexible sheet member being rectangular, said attaching operation being further defined in that said two branches of said L-shaped seam are formed simultaneously so as to extend respectively along two orthogonal edges of said sheet member, one of said edges being parallel and opposed to said one edge of said sheet member nearest said one transverse end of said tubular article.

3. Process according to claim 1, said flattening of said article being carried out so as to position said cut to coincide with said crease.

4. A self-closing flexible container, comprising
    (a) a tubular article having two longitudinal edges and an upper and lower transverse edge, said article defining a longitudinal axis and a pair of opposed internal surfaces,
    (b) a single flat flexible sheet member disposed inside of said article and having an upper edge of said member spaced from and below said upper transverse edge of said article and an outer edge of said member extending parallel to said axis,
    (c) means attaching said sheet member to only one of said internal surfaces of said article,
    (d) said attaching means consisting of a single L-shaped fastening having two intersecting orthogonal branches both disposed on one of said surfaces,
    (e) one of said branches being parallel to said longitudinal axis of the article and being spaced slightly toward said axis from outer edge of said member,
    (f) means providing an opening through said one surface of said article from a point inwardly of the intersection of said two branches and in a direction substantially parallel to said longitudinal axis, said opening being spaced slightly toward said axis from said one branch,
    (g) a crease extending along one longitudinal edge of said article and spaced outwardly relative to said axis from said opening and from said one branch,
    (h) and means sealing at least one transverse end of said tubular article,
    (i) said sealing means joining only said two opposed article surfaces and thus leaving said upper edge of said member unattached.

References Cited by the Examiner
UNITED STATES PATENTS

| | | | |
|---|---|---|---|
| 810,349 | 1/06 | Rogers | 229—62.5 X |
| 2,696,342 | 12/54 | Toborg. | |
| 2,870,954 | 1/59 | Kalesza | 229—62.5 |
| 3,003,682 | 10/61 | Mattson | 229—62.5 |
| 3,051,209 | 8/62 | Gonzalez | 150—9 |
| 3,102,676 | 9/63 | Danelli et al. | 229—62.5 |

FOREIGN PATENTS

| | | |
|---|---|---|
| 1,184,550 | 2/59 | France. |
| 904,728 | 2/54 | Germany. |
| 878,549 | 10/61 | Great Britain. |

FRANKLIN T. GARRETT, *Primary Examiner.*
EARLE J. DRUMMOND, *Examiner.*